Aug. 8, 1950  C. W. EARP  2,517,549
PULSE RADAR SYSTEM FOR DETECTING MOVING OBJECTS
Filed Sept. 9, 1942
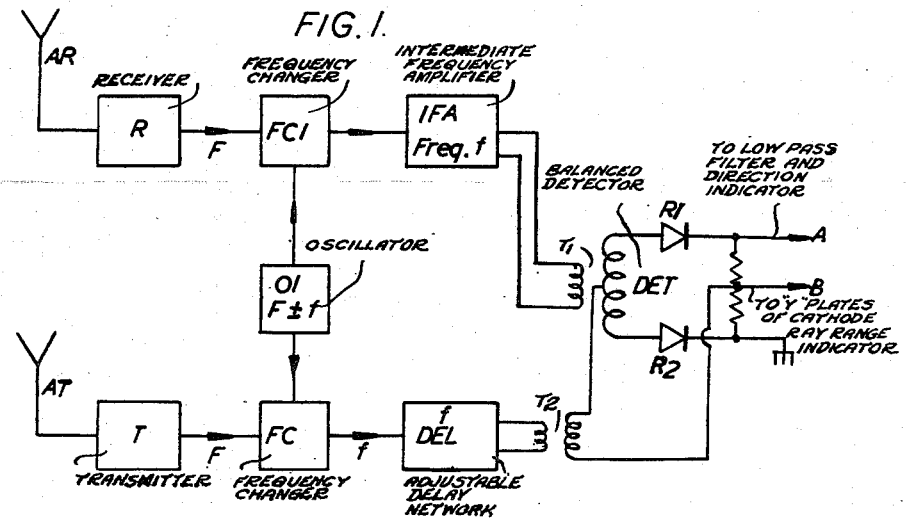
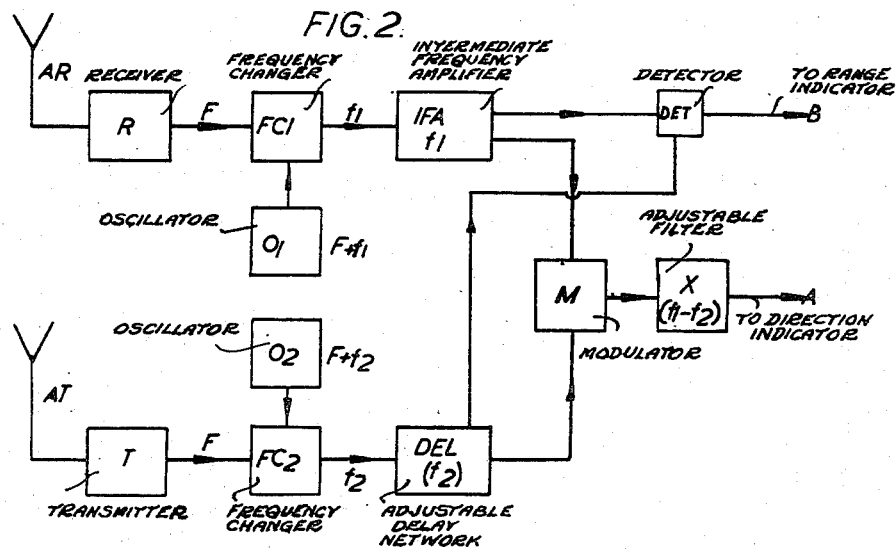
INVENTOR
C. W. Earp
BY Loyd Hall Sutton
ATTORNEY Patented Aug. 8, 1950

2,517,549

UNITED STATES PATENT OFFICE 2,517,549

PULSE RADAR SYSTEM FOR DETECTING MOVING OBJECTS

Charles William Earp, London, England, assignor, by mesne assignments, to International Standard Electric Corporation, New York, N. Y., a corporation of Delaware Application September 9, 1942, Serial No. 457,788
In Great Britain March 14, 1941

Section 1, Public Law 690, August 8, 1946
Patent expires March 14, 1961

4 Claims. (Cl. 343—9)

The present invention relates to systems for obstacle detection by means of electromagnetic waves and of the kind employing pulses comprising short trains of waves of high frequency which are received at a receiver after reflection from the obstacle.

The object of the invention is to provide arrangements in such a system for the demodulation of the received pulses whether the transmitted pulses are repetitive at substantially equal intervals of time or at random intervals of time.

The specification of British Patent No. 586,115 describes how waves of a repetitive nature may be considered to bear a constant and a "spurious" modulation which latter carries no intelligence. Such a spurious modulation is caused by the repetition frequency and causes the signal to occupy a frequency band width much greater than that which is strictly required for the transmission of the information of the signal. A general arrangement for demodulation of such a wave is described, in which all spurious modulation is removed, and this arrangement is applied herein to the art of obstacle detection by transmission of radio pulses.

The specification of British Patent No. 586,115 shows that a signal wave of a repetitive nature may be efficiently detected or demodulated by beating the wave together with a locally generated wave of a similar wave-form.

According to the disclosure of the above application the signal wave and a locally derived wave of the same frequency and phase and preferably of the same shape as the signal wave form are respectively applied to the two input circuits of a differential detector or balanced modulator. The direct current component of the output from the differential detector is due only to identical frequency components in the two inputs, the value and sign depending upon the relative phase of the two components. The total D. C. output is proportional to all the signal components plus random positive and negative components due to noise. The demodulating device therefore utilizes every signal component of the original wave, adding them together arithmetically. Noise components, however, are added up as vectors, and certain types of noise, tend to cancel each other out all together. A low-pass filter in the output of the detector removes higher frequencies not required for the complete signal and much of the noise as well.

The present invention provides arrangements for generating the locally generated wave conveniently from the outgoing pulses from the transmitter by the use of a delay network which produces a delay equal to the time taken for transmission of a pulse to and from the detected obstacle. By this means, the maximum possible signal to noise ratio consistent with the speed of indication required can be obtained, and further incidental advantages are gained. For example, the exact distance of the obstacle can be measured in terms of the amount of delay used, according to known technique. The arrangement provides also convenient means for selection of a particular echo for determination of its direction without impairing the cathode ray range analysis usually associated with an obstacle detection system.

According to the present invention, a system for obstacle detection of the type hereinbefore specified is characterised in this that the received waves are combined with the transmitted waves passed via a second transmission path before application to obtain a required indication. When an indication of distance of the obstacle from the receiver for example is desired, a system for obstacle detection of the type specified is characterised in that the received waves and the waves directly from the transmitter, after passing through a second transmission path, are respectively applied to the two input circuits of a differential detector or balanced modulator, the output of which is used to obtain the required indication. When an indication of the relative movement of the obstacle with respect to the receiver is required, a system for obstacle detection as hereinbefore specified is characterised in that either or both the received waves and waves directly from the transmitter in a second transmission path are changed in frequency and then combined and the sum or difference frequency is used to obtain the desired indication.

The invention will be made clearer from the following description taken in conjunction with the accompanying drawings, in which:

Fig. 1 shows diagrammatically an obstacle detection system incorporating the present invention; and Fig. 2 shows diagrammatically the system shown in Fig. 1 adapted to give an indication of an obstacle having a predetermined velocity relative to the detecting apparatus.

Referring now to Fig. 1 of the accompanying drawings, the transmitter T sends out pulses comprising short trains of mean high frequency F, and these are received as reflections from obstacles in the receiver R. The transmitting and receiving antennae are shown at AT and AR respectively. The frequency changer FC1, supplied from an oscillator O1 at frequency $(F \pm f)$ converts the pulses of the train to pulses of a mean intermediate frequency $f$. After amplification in an intermediate frequency amplifier IFA, the reflected signals are applied to a balanced detector arrangement DET comprising two rectifiers R1, R2 connected as shown. Output B provides a direct current due to the rectifying action of R2, and may be applied to the Y plates of a cathode ray indicator. If the X-plates of this indicator are fed from a time-base of pulse recurrence frequency, an orthodox range analysis is provided.

Transmitted pulses are also applied from T to the frequency changer FC2, which is also fed from the oscillator O1 of frequency $(F \pm f)$, and the pulses of the transmitted pulse train are converted to pulses of a mean high frequency $f$. Here an adjustable delay network DEL is inserted before application of the pulse train to the balanced detectors DET.

The output from DEL serves as a marking signal which is added to the output B, and this marking signal can be "timed" (by operation of the delay adjustment control) to coincide on the cathode ray indicator with any particular echo.

On selection of a particular echo, the differential output A from the detector DET provides a D. C. output corresponding to this echo signal. The outpjut A is reinforced by each pulse of the reflection selected from DEL though noise currents produce random positive and negative contributions, so that a low-pass filter will provide an indenfinite improvement of signal to noise ratio at the expense of slowness of indication. This cumulative output A may, of course, be used for directional analysis of the obstacle to which Fig. 2 shows a modification of the circuit of Fig. 1, which is capable of discriminating against all obstacles except the one which is not only at the range selected, but which has, also, a particular relative velocity with respect to the detecting apparatus.

In this circuit the frequency of the pulses of the received signal pulse train is transformed in FC1 by oscillations from O1 to a mean high frequency of $f_1$, and the frequency of the pulses of the locally generated comparison pulse in FC2 by oscillations from O2 to a frequency $f_2$. The two pulse trains are combined in a modulator M and a filter X passing frequency $f_1-f_2$ selects a particular echo determined by the adjustment of DEL.

(Range analysis is provided as before, by detecting the received signals in detector DET, and a marking signal may be provided by introducing the comparison pulses from the delay network DEL to the same detector as in the case of Fig. 1.)

The signal-to-noise ratio provided at output A depends upon the bandwidth of the final filter and, as before, indefinite improvement is possible at the expense of slowness of indication.

Now, a moving obstacle causes the received pulses to differ in mean high frequency from the transmitted pulses, as known from the Doppler effect, by a frequency $\Delta$. Such an obstacle produces a pulse train of frequency $(f_1 \pm \Delta)$ in intermediate frequency amplifier IFA, and the output from M is at $(f_1 \pm \Delta - f_2)$. Thus by setting the output filter to this new frequency, discrimination is provided against all obstacles except the one which has a particular velocity with respect to the detecting apparatus. In order to detect a moving obstacle the new frequency to which the filter is adjusted is $(f_1 + \Delta - f_2)$. The filter is tuned to the new frequency including the $\Delta$ factor. The initial setting of the filter for the difference frequency $(f_1 - f_2)$ does not take into account the difference frequency of a moving object in the general range determined by the delay network. The filter has to be adjusted to a new frequency including the $\Delta$ or Doppler effect if a moving target is to be detected. The circuit of Fig. 2 thus is useful in selecting a given obstacle which has a particular relative velocity with respect to the detecting apparatus. Either the target or the detecting apparatus may be stationary or moving with respect to the other. The adjustment of the filter X serves to select a taraget having a desired relative velocity with respect thereto, as determined by the adjustment delay network DEL.

Pulses are transmitted from the detecting station "toward the vicinity of said moving object" meaning that more than one possible target will act as a reflector and produces echoes at the detector station. Thus at the detector these reflected signals or echoes are converted into "waves having various intermediate frequencies." The pulses which are generated for transmission at the detector station are also used for deriving other pulses which in turn are converted into "an intermediate frequency" different from those of the intermediate frequencies derived from the pulses reflected from said moving object. The conversion of the pulses in the transmitting and the receiving circuits will therefore produce in one case a number of intermediate frequencies "including one frequency dependent in value on the relative velocity . . .," wherefrom the desired difference frequency is selected and used for indication.

Whilst the invention has been described in a case where a train of pulses is employed in which the pulses are repetitive at substantially equal intervals of time, it is equally applicable to the case in which single pulses are transmitted or pulses at random intervals of time are transmitted.

What is claimed is:

1. An obstacle detecting system comprising a transmitter for generating pulses comprising short trains of electromagnetic waves, means for radiating said waves, a receiver for receiving said waves after reflection by an obstacle, a first frequency changer, means for applying said received waves to said frequency changer for conversion to an intermediate frequency, a second frequency changer, means for applying waves generated by said transmitter directly to said second frequency changer for conversion to a different intermediate frequency, a modulator, means for applying the output of said first frequency changer to said modulator, means including an adjustable delay network for applying the output of said second frequency changer to said modulator, and a connection from the output of said modulator to an indicating device including a filter for selecting waves having a frequency equal to the difference between said intermediate frequencies.

2. An obstacle detection system according to claim 1, further comprising a detector, a connection from said first frequency changer to an input circuit of said detector, a connection from said adjustable delay network to an input of said detector, and a connection from the output of said detector to a range indicating device.

3. An obstacle detecting system comprising a transmitter for generating pulses comprising short trains of electromagnetic waves, a receiver for receiving said waves after reflection by an obstacle, means for converting said received waves to waves having a first intermediate frequency, means for converting waves received directly from said transmitter to a second intermediate frequency, a modulator, means for applying said first intermediate frequency waves and said second intermediate frequency waves over separate paths to said modulator one of said paths including an adjustable delay network, and a connection from the output of said modulator to an indicating device including an adjustable filter for selecting waves having a frequency equal to the difference between said intermediate frequencies.

4. The method of detecting by electromagnetic radiation an object moving at a definite velocity which comprises generating and transmitting toward the vicinity of said moving object for reflection by objects in said vicinity including said moving object, pulses comprising short trains of electromagnetic waves, receiving said reflected waves and converting them into waves having various intermediate frequencies, deriving from said generated pulses other pulses comprising short trains of electromagnetic waves and converting them into waves having an intermediate frequency different from those of the intermediate frequencies derived from the pulses reflected from objects in said vicinity, combining said waves having various intermediate frequencies with said wave of different intermediate frequency to produce difference-frequencies including one frequency dependent in value on the relative velocity between the said moving object and the detecting station, selecting said last mentioned difference frequency and visually indicating the presence of said selected difference-frequency.

CHARLES WILLIAM EARP.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,055,883 | Terry | Sept. 29, 1936 |
| 2,225,524 | Percival | Dec. 17, 1940 |
| 2,227,598 | Lyman et al. | Jan. 7, 1941 |
| 2,253,589 | Southworth | Aug. 26, 1941 |
| 2,268,643 | Crosby | Jan. 6, 1942 |
| 2,403,625 | Wolff | July 9, 1946 |
| 2,406,316 | Blumlein et al. | Aug. 27, 1946 |
| 2,408,742 | Eaton | Oct. 8, 1946 |
| 2,423,023 | Hershberger | June 24, 1947 |
| 2,423,644 | Evans | July 8, 1947 |